Dec. 27, 1927.  
E. WILDHABER  
1,654,199  
METHOD OF PRODUCING GEARS  
Filed Dec. 23, 1925

Ernest Wildhaber INVENTOR

ATTORNEY

Patented Dec. 27, 1927.

1,654,199

UNITED STATES PATENT OFFICE.

ERNEST WILDHABER, OF ROCHESTER, NEW YORK, ASSIGNOR TO GLEASON WORKS, OF ROCHESTER, NEW YORK, A CORPORATION OF NEW YORK.

METHOD OF PRODUCING GEARS.

Application filed December 23, 1925. Serial No. 77,309.

The present invention relates to a method of producing curved tooth gears. In particular this invention relates to a method of producing curved tooth gears such as form members of a pair of gears in which one member is provided with tooth surfaces shaped as parts of surfaces of revolution, that is, non-generated, and in which the other member has tooth surfaces generated conjugate to those of the first gear.

The primary object of this invention is to provide a method for producing curved tooth gears of the character specified which will permit the use of a simplified system of tools.

A further object of this invention is the provision of a method for cutting curved tooth gears of the character specified which will make possible the employment of the same tool in cutting both members of a pair.

A further object of this invention is the provision of a method for cutting curved tooth gears of the character specified which will permit the use of the same tool in cutting various gears regardless of their spiral or dedendum angles.

Other objects of the invention will be apparent hereinafter from the specification and the recitation of the appended claims.

In the accompanying drawing, I have illustrated one preferred method of practising this invention. It will be understood, however, that the invention is capable of further modification within its scope and the limits of the appended claims.

Figure 7:
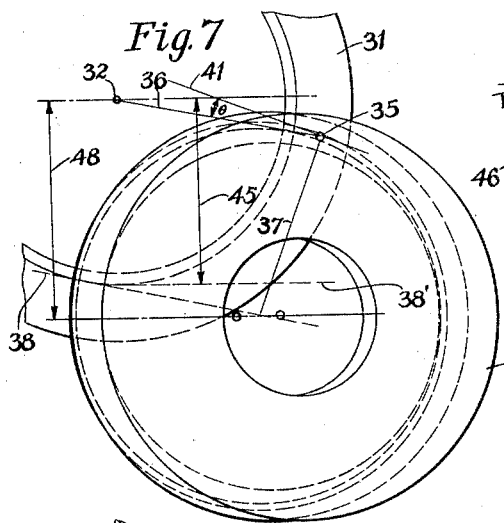
Figure 9:
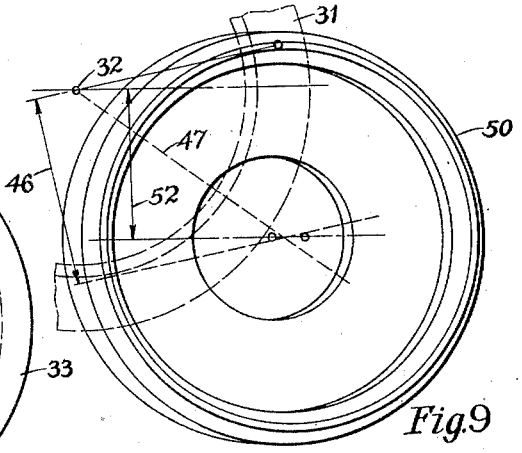
Figure 8:
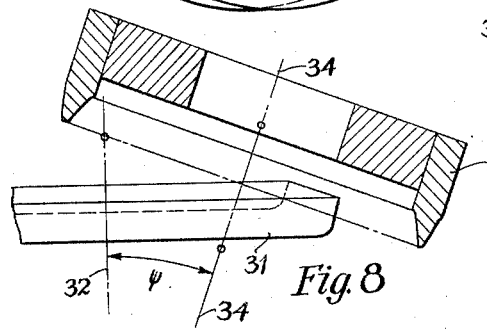
Figure 10:
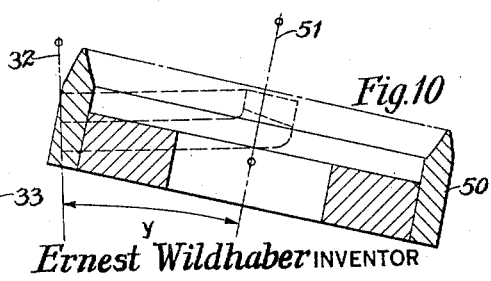

Figs. 7 and 8 are fragmentary plan and elevational views, respectively, illustrating diagrammatically the method of practising this invention in the production of a non-generated gear; and Figs. 9 and 10 are fragmentary plan and elevational views, respectively, illustrating diagrammatically the method of positioning the tool employed in cutting the gear, relatively to the axis of the gear, so as to use the same in producing a conjugate generated mating gear.

In such methods as have heretofore been proposed for cutting a pair of gears in which one member is non-generated and the other member is generated conjugate to the first, different tools are required for cutting gear and pinion and different tools are also required for cutting gears or pinions of different spiral and different dedendum angles. In cutting such gears by prior methods, therefore, a large number of cutters were required. The present invention provides a method whereby a single tool may be used to cut both members of a pair of such gears and also to cut various gears or pinions regardless of their spiral angle or dedendum angle. The present invention, hence, permits of a very considerable reduction in the number of tools which ordinarily would be required and hence permits of a considerable saving in tool costs with a standardization upon a few tools of the pressure angles usually employed.

Briefly stated, the present invention is based upon the conception that by tilting a tool of a standard form relatively to the gear blank to be cut, so as to vary the inclination of the axis of the tool to the axis of the blank and the relative offset of these axes it will be possible to incline the axis of the same to any desired angle relative to the blank axis and to incline the cutting edge of the tool to any desired angle relative to the tooth surface to be cut. Thus one tool, or tools of identical construction, may be used to cut various gears regardless of spiral or dedendum angle and regardless of whether their tooth surfaces are generated or non-generated. Thus one tool may be used to cut gears where, according to methods heretofore proposed, a plurality of tools would be required. The present method moreover is exact and theoretically correct.

The present invention relates particularly to a method in which a male tool is employed to cut both members of a pair. It may be applied to the production of pairs of gears in which the profile of the teeth of the non-generated member is straight or curved. This invention is particularly applicable to the production of curved tooth or spiral bevel and hypoid gears, but it will be understood that it may be employed also in the production of curved tooth spur gears or of other types of curved tooth gears.

For the purposes of illustration, the invention is described hereinafter in connection with the production of a pair of gears in which the tooth surfaces of the non-generated member are spherical surfaces of revolution. Referring to the drawings:

In the methods heretofore proposed for cutting gears of the character stated, one tool was required for cutting the gear and another tool for cutting the pinion. This is illustrated in Figs. 2 and 3 in which a gear cutter 10 and a pinion cutter 11 are shown by way of comparison. Both these tools may be rotary annular face mills of the general character shown in Fig. 1 and provided with a plurality of cutting blades of circular profile. To produce the gear, the gear cutter 10 would be rotated on its axis in engagement with the blank, while the blank was held stationary. This would produce on the blank tooth surfaces which were surfaces of revolution whose profile was complementary to the profile of the cutting tool. In case the cutting tool was provided with blades of circular profile such as shown on the tool 10 the gear would have tooth surfaces which were spherical surfaces of revolution. A straight sided tool would produce a gear whose tooth surfaces are conical surfaces of revolution. The pinion would be produced by rotating a tool such as shown at 11, whose cutting blades were of circular profile, if the tool used to produce the mate gear was of circular profile and of straight profile, if the tool used to produce the mate gear had a straight cutting surface, in engagement with a blank, while the tool and blank were rolled relatively to each other in the manner of a gear meshing with the first gear. According to the methods heretofore proposed, the gear tool 10 would have cutting blades 12 provided with a circular cutting surface 13 on the outside whose radius of curvature 14 was larger than the radius of curvature 15 of the inside circular cutting surface 16, and the pinion tool 11 would have cutting blades 17 provided with circular cutting surfaces 18 and 19, of which the cutting surface 18 has a smaller sphere radius 20 than the sphere radius 21 of the cutting surface 19, and in which the sphere radius 20 would equal the sphere radius 15 of the gear cutter and the sphere radius 21 would equal the sphere radius 14 of the gear cutter.

This method of producing a pair required, therefore, a separate tool for gear and pinion. For cutting gears or pinions of different spiral or different dedendum angles, tools having cutting surfaces which were differently inclined to the cutter axis would be required. The difference in structure between tools required according to these heretofore proposed methods for cutting gears of different spiral or different dedendum angles would be similar to the difference in structure between the tool required for cutting a gear or wheel and the tool required for cutting a pinion, save that usually, of course, the outside radius of the tool employed for cutting the gear is larger than its inside radius. Thus for cutting gears or pinions of one spiral and dedendum angle, the cutting blades might have the inclination to their axis 22 of the cutting blades 12 of the tool 10, while for cutting gears or pinions of a different spiral or dedendum angle, the cutting blades might have an inclination to their axis 23 such as have the cutting blades 17 of the tool 11.

With the present invention it is possible to use the same tool to cut both members of a pair of gears and to use the same tool to cut various gears regardless of their spiral or dedendum angles and the formation of their tooth surfaces. The present invention may be practised with a tool designed to cut theoretically accurate teeth, or with a tool so constructed as to cut gears of somewhat modified tooth shape for the purpose of localizing bearing or making the gears less sensitive to misalignment and small errors in mounting.

Figure 1:
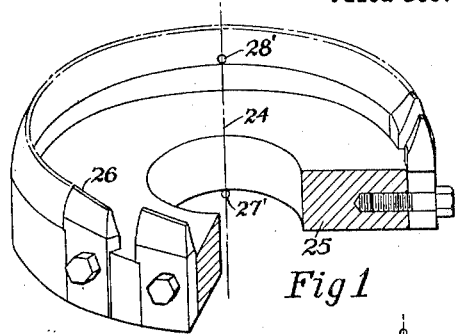
Fig. 1 is a perspective view of one type of tool such as might be employed in practising this invention.
Figure 2:
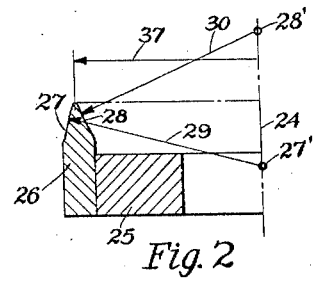
Fig. 2 is a fragmentary axial sectional view of this tool.
Figures 3, 4, 5, 6:
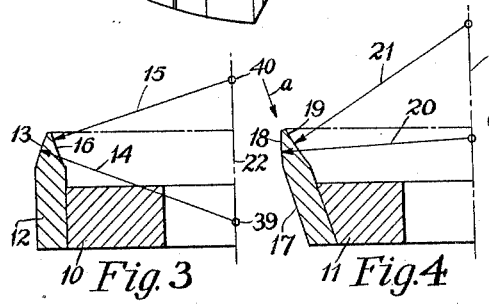
Figs. 3 and 4 are sectional views of two tools such as would be required for producing a pair of gears of the character specified in practising the methods heretofore proposed for producing such gears.
Fig. 5 is a sectional view of a modified form of tool which might be employed in practising this invention.
Fig. 6 is a sectional view of a still further modified form of tool which might be employed in practising this invention.

For producing theoretically accurate gears, a tool such as shown in Figs. 1 and 2 will, preferably, be utilized. This tool 25 is in the form of a rotary annular face mill provided with a plurality of cutting blades 26 having cutting surfaces 27 and 28 of equal sphere radius 29 and 30 respectively whose sphere centers are at 27' and 28' respectively on the axis 24 of the tool. This same tool or a tool of identical construction can be used for cutting both members of a pair of gears of the character referred to and may be used for cutting various gears of different spiral and different dedendum angles. The method whereby this tool may be employed to accomplish this result will be described now.

Referring to Figs. 7 and 8, 31 indicates a gear blank having an axis 32 and 33 indicates a rotary cutter having an axis 34. 35 indicates a point midway of the length of a tooth such as might be produced by rotating the tool in engagement with the blank while the same is held stationary on its axis, and 36 indicates a line connecting the point 35 with the apex 32 of the blank. In the methods heretofore proposed for cutting the gear blank 31 by the process described, and especially in those methods employing a male tool, the cutter was so positioned with relation to the blank that its axis 34 was offset from the axis of the blank by an amount equal to the product of the mean cutter radius 37 (Fig. 2) and the cosine of the spiral angle Θ of the teeth to be produced on the blank. So located, the cutter axis would be projected in Fig. 7 into the line 38 or into any line 38′ which was at the same distance from the gear blank axis 32 as the line 38. With the cutter position thus fixed, as required by the methods heretofore proposed, and assuming, as usual, equal pressure angles on both sides of the gear teeth, the inclination of the cutting edges or surfaces would be an already determined quantity. In other words with the cutter position thus fixed the location of the sphere centers 39 and 40 (Fig. 3) would be fixed and hence the structure of the tool definitely determined. Consequently, for cutting a gear of a given spiral or dedendum angle, a special cutter had to be employed and this cutter could not be used to cut gears of other spiral or dedendum angles.

With the present invention, a standard cutter may be employed to cut both members of a pair of gears and various gears. This is accomplished by tilting the cutter to vary the inclination and offset of its axis relative to the blank axis to suit the various gears to be cut. This adjustment of the cutter to vary the inclination and offset of its axis relative to the blank axis may be considered as a tipping of the cutter axis 34 about the longitudinal tangent 41 of the teeth to be produced on the gear. By tipping the cutter axis about this longitudinal tangent, the axis of the cutter may be inclined to any desired angle relative to the tooth surfaces to be cut, hence the cutter can be brought into any position suitable for the predetermined standard cutter.

The tipping of the tool about this tangent 41 does not actually have to be performed. If the result desired is secured by any other adjustment or adjustments of the tool, this is sufficient. The important thing is the final position of the cutter.

My method results in a slight change in the angle Ψ between the cutter axis and the blank axis (Fig. 8) as compared with methods heretofore proposed. According to these latter methods, the angle between these two axes 34 and 32 is equal to 90° minus the root angle of the gear, the root angle being the angle between a plane tangent to the bottom of the tooth space and the axis of the blank. With the present invention, this angle between the tool and blank axis will be increased slightly. With known methods, as previously stated, the cutter axis will be offset from the blank axis a distance 45 equal to the product of the mean cutter radius 37 and the cosine of the spiral angle Θ of the teeth to be produced upon the blank; with the present invention this offset 48 will be increased. Usually this offset will be greater than the mean cutter radius.

With the present invention the tool will be positioned as described for cutting a non-generated gear and the tool as usual will be rotated on its axis in engagement with the blank, while the blank itself is held stationary.

In cutting a pinion conjugate to a gear of the character just described, that is, generated, previously proposed methods differ. According to one method the offset of the pinion cutter from the axis of the gear it represents, that is, the gear on which the blank is theoretically rolled to produce the generated tooth profiles, is the same as the offset of a tool when producing that gear, namely the product of the mean cutter radius and the cosine of the spiral angle. According to this method the tool would be offset by a distance 46 (Fig. 9) from the axis 32 of the gear with which theoretically the blank is rolled during cutting. In another method, the axis of the pinion cutter 47 when prolonged will intersect the axis 32 of the gear.

In producing a pinion according to this invention, the same principles are applied as laid down above for producing the gear. The cutter axis is inclined and offset from the blank axis so as to incline the cutting blades of the tool to the desired angle relative to the tooth surface to be produced on the pinion. This is illustrated in Figs. 9 and 10, where 32 again indicates the axis of the gear 31 with which the blank is theoretically rolled, 50 indicates the cutter and 51 its axis. By applying the present invention to the production of the pinion, this tool 50 may be identical with the tool 33 used to produce the gear. In cutting the pinion, however, the offset of the tool axis 51 from the gear axis 32 will be smaller than the offset 48 in cutting the gear and smaller than the product of the mean cutter radius and the cosine of the spiral angle of the gear. The amount of the offset is indicated at 52. This distance will always be different from zero and smaller than the offset 46 of the tool according to known art. The inclination of the tool axis to the gear axis will depend upon the cone angle of the gear and the offset of the tool. In cutting the pinion according to this invention, the tool will be set in the manner just described and will be rotated on its axis in engagement with the blank while the tool and blank are rolled relatively to each other in the manner of a gear meshing with its mate gear. The position of the pinion blank has not been shown in Figs. 9 and 10 for clearness. When bevel gears are being cut the pinion axis will intersect the axis of the gear 31 and when hypoid gears are being cut the pinion axis will be offset from the gear axis.

Having thus described my invention as applied to the production of theoretically accurate gears, that is, gears having mathematically mating tooth surfaces, it is only necessary to add a few words with respect to the production of gears having a somewhat modified form of tooth. In many cases, especially if the gear and pinion mounting can not be made accurate enough or if the mounting is not rigid, it is desirable to produce tooth surfaces on gear and pinion which will permit of some relative adjustment of these members. In such cases a slight departure from theoretical tooth forms may be desirable. In such cases a tool similar to that shown in Fig. 3 may be employed, in which the radius of the outside spherical cutting surface is somewhat greater than the radius of the inside spherical cutting surface. The same tool, however, will be used for cutting both gear and pinion and the tool will be set with relation to the gear for cutting gear and pinion in the manner already described. This is in contradistinction to the methods heretofore proposed which would require two different cutters for producing the gear and pinion.

The modification of the cutter according to the manner just described will result in a tooth bearing which is in the center of the face, in an accurately mounted pair, and which gradually decreases toward the two ends of the teeth. The transverse profiles of the teeth will be of substantially the same conformation as those produced with tools such as shown at 25 in Figs. 1 and 2.

When it is desired to produce gears having tooth surfaces of somewhat modified profile from those produced by the tools 25, a cutter may be employed such as shown at 60 in Fig. 5 in which the cutting blades will be provided with cutting surfaces of different sphere radii 61 and 62 respectively of which the sphere center 65 of the surface 63 will be located on one side of the cutter axis 64 and the sphere center 66 of the surface 67 will be located on the other side of the axis. In cutting a pair of gears with these modified profiles the same tool may be employed to produce both members of the pair.

According to my method, various gears may be produced with a small number of cutters of a desirable shape, whereas, heretofore, gears of the same character would have to be produced with special cutters, some of which, such as that shown in Fig. 4 would be of an undesirable structure. With my invention the process of cutting becomes standard and may be practised with the employment of a small number of tools.

A further advantage of this invention is that it permits of relieving the cutting blades of both gear and pinion tools in the direction of the cutter axis, as shown. This permits of relieving the blades in such way that the cutting profile is preserved after resharpening. This is a distinct advantage, for a pinion cutter, such as indicated in Fig. 4 as necessary with previous methods of cutting, could only be relieved in a direction inclined to the cutter axis 23, as indicated by the arrow $a$, to provide proper cutting clearance. This necessary method of relieving the pinion tool 11 would result in reducing the diameter of the cutting surfaces after sharpening so that the individual blades would have to be adjusted outwardly to restore the original cutting surface.

While the present invention has been described particularly with reference to the production of gears with tools having circular cutting surfaces, it will be understood that it is capable of use with tools of different curvature and with straight sided tools such as that shown in Fig. 6. The tool 70 of Fig. 6 is provided with an outside cutting surface 71 and an inside cutting surface 72 which will sweep out conical surfaces of revolution when the tool is rotated on its axis. This tool may be employed for cutting both gear and pinion and for cutting various gears or pinions by positioning it in the manner already described.

In cutting the non-generated member according to this invention, it is preferable to finish both sides of a tooth space before indexing, that is to cut the two sides simultaneously. Where no cutter of proper point width is at hand, however, or where it is desired for any other reason, the gear may be cut one side at a time and the tool and blank reset to cut the other side after one tooth side has been cut all the way around the gear. In cutting the pinion or the mate generated gear, I usually cut one side at a time, especially in the case of hypoid gears. In doing so I preferably keep the angular setting $\gamma$ shown in Fig. 10 when cutting either side. It is to be understood, however, that it is possible to cut the pinion both sides simultaneously.

Both gear and pinion will be cut tapering depth, that is, with the height of the teeth diminishing toward the apex. Preferably the gear and pinion will be cut so that all elements of their tooth surfaces intersect in the apex.

While, preferably, a rotary annular tool such as shown will be employed, it is obvious that a planing tool may be used so set that the axis about which it moves is inclined and offset in the manner described with reference to the tools 25 illustrated. The cutting tool may be a milling tool or a planing tool or a grinding or a lapping tool as desired.

While I have illustrated certain preferred embodiments of my invention, it will be understood that the invention is capable of further modification within the limits of the disclosure and the scope of the appended claims and that this application is intended to cover any variations, uses, or adaptations of the invention and including such departures from the present disclosure as come within known or customary practise in gear cutting and may be applied to the essential features hereinbefore set forth and as fall within the scope of the appended claims.

Having thus described my invention, what I claim is:

1. The method of producing curved tooth gears which consists in rotating a tool, having an annular cutting portion, in engagement with a stationary gear blank, while maintaining the tool so positioned relatively to the blank that its axis is offset from the apex of the blank an amount greater than the mean radius of the tool.

2. The method of producing curved tooth gears which consists in rotating a tool, having an annular cutting portion, in engagement with a stationary gear blank, while maintaining the tool so positioned relatively to the blank that its axis is inclined to the axis of the blank by an angle greater than 90° minus the root angle of the gear to be produced.

3. The method of producing curved tooth gears which consists in rotating a toll, having an annular cutting portion, in engagement with a stationary gear blank, while maintaining the tool so positioned relatively to the blank that its axis is offset from the apex of the blank an amount greater than the mean radius of the tool and is inclined to the axis of the blank by an angle greater than 90° minus the root angle of the gear to be produced.

4. The method of producing curved tooth gears which consists in rotating a tool, having an annular cutting portion, in engagement with a stationary gear blank, while maintaining the tool so positioned relatively to the blank that its axis is offset from the apex of the blank an amount greater than the mean radius of the tool multiplied by the cosine of the spiral angle of the tooth to be produced.

5. The method of producing curved tooth gears which consists in rotating a tool having an annular cutting portion of circular arc profile in engagement with a stationary gear blank, while maintaining the tool so positioned relatively to the blank that its axis is offset from the apex of the blank an amount greater than the mean radius of the tool.

6. The method of producing curved tooth gears which consists in rotating a tool, having an annular cutting portion of circular arc profile in engagement with a stationary gear blank, while maintaining the tool so positioned relatively to the blank that its axis is offset from the apex of the blank, an amount greater than the mean radius of the tool multiplied by the cosine of the spiral angle of the gear to be produced.

7. The method of producing curved tooth gears which consists in rotating a tool having an annular cutting portion of circular arc profile in engagement with a stationary gear blank, while maintaining the tool so positioned relatively to the blank that its axis is inclined to the axis of the blank by an angle greater than 90° minus the root angle of the gear to be produced.

8. The method of producing curved tooth gears which consists in rotating a tool, having an annular cutting portion, in engagement with a stationary gear blank, while maintaining the tool so positioned relatively to the blank that its axis is offset from the apex of the blank an amount greater than the mean radius of the tool multiplied by the cosine of the spiral angle of the gear to be produced and is inclined to the axis of the blank by an angle greater than 90° minus the root angle of the gear to be produced.

9. The method of producing gears which consists in moving a tool in a curved path across the face of the blank to cut longitudinally curved teeth of tapering depth while maintaining the tool so positioned relatively to the blank that the axis about which it moves is inclined to the blank axis by an amount more than 90° minus the root angle of the gear to be cut.

10. The method of producing gears which consists in moving a tool in a curved path across the face of a stationary gear blank, while maintaining the tool so positioned relatively to the blank axis that the axis about which it moves is offset from the blank axis more than the mean radius of the tool.

11. The method of producing gears which consists in moving a tool in a curved path across the face of a stationary gear blank, while maintaining the tool so positioned relatively to the blank axis that the axis about which the tool moves is offset from the blank axis more than the mean radius of the tool multiplied by the cosine of the spiral angle of the gear to be cut.

12. The method of producing a pair of curved tooth gears which consists in cutting one member of the pair by moving a rotary tool in a curved path across the face of a stationary gear blank, while maintaining the axis of said tool in definite offset relation to the axis of the blank, and in cutting the other member of the pair by moving an identical tool in a curved path across the face of the gear blank, while rolling the tool and blank relatively to each other in the manner of a gear meshing with the mate gear while maintaining the axis of the tool offset from the axis of the mate gear but by an amount less than its offset in cutting such mate gear.

13. The method of producing a pair of curved tooth gears which consists in cutting each tooth surface of one member of the pair by moving a rotary tool in a curved path across the face of a stationary gear blank, while maintaining the axis of said tool in definite offset relation to the axis of the blank, and in cutting each tooth surface of the other member of the pair by moving a tool whose profile is of the same curvature as the tool employed in cutting the contacting tooth surface of the first gear in a curved path across the face of the gear blank, while rolling the tool and blank relatively to each other in the manner of a gear meshing with the mate gear while maintaining the axis of the tool offset from the axis of the mate gear but by an amount less than its offset in cutting such mate gear.

14. The method of producing a pair of curved tooth gears which consists in cutting one member of the pair by moving a rotary tool in a curved path across the face of a stationary gear blank, while maintaining said tool so positioned relative to the blank that its axis is offset from the axis of the blank more than the mean radius of the tool, and in cutting the other member of the pair by moving an identical tool in a curved path across the face of the gear blank while rolling the tool and blank relatively to each other in the manner of a gear meshing with the first gear and while maintaining the axis of the tool so positioned relatively to the axis of the gear with which the blank is rolling that it is offset from the axis of the first gear but by an amount less than its offset in cutting the first gear.

15. The method of producing one of a pair of curved tooth gears, of which one member is non-generated and the other member is generated by a rolling motion of the tool and blank relatively to each other in the manner of a gear meshing with its mate gear, which consists in bodily adjusting a tool whose cutting edge has a definite inclination to the axis about which the tool moves, about a line tangent to a side of the tooth to be produced, until the cutting edge assumes the desired inclination relative to the side of said tooth and imparting between tool and blank the required relative movement.

16. The method whereby different curved tooth gears of different tooth characteristics, forming members of a pair of gears in which one member is non-generated and the other member is generated by a rolling motion of the cutting tool and blank relatively to each other in the manner of a gear meshing with its mate gear, may be produced with a rotary tool having an annular cutting portion whose effective cutting edge has a definite inclination to the tool axis which consists in adjusting the tool in cutting each gear until its cutting edge has the desired inclination to the tooth surface to be produced on said gear and imparting between tool and blank the required relative movement.

17. The method of producing a pair of curved tooth gears which consists in producing one member of the pair by moving in a curved path across the face of a stationary gear blank a tool whose cutting edge has a definite inclination to the axis about which the tool moves, and in producing the other member of the pair by moving a tool, whose cutting edge moves on a circle of equal radius to that of the first cutting edge and has the same inclination to the axis about which it moves as the first tool, in a curved path across the face of the blank while rolling the tool and blank relatively to each other in the manner of a gear meshing with the first gear.

18. The method of producing a pair of longitudinally curved tooth gears which consists in cutting the side tooth surfaces of each gear with rotary annular face mills, corresponding cutting edges of which are located on the same radius and have the same inclination to the axes of the respective tools, by offsetting and inclining the axes of the respective tools from the respective blank axes to secure the desired spiral and dedendum angles on the blanks and to give the cutting edges of the tools the required inclinations to the tooth sides to be cut to produce the desired pressure angles on the tooth sides of the blank.

19. The method of producing a pair of longitudinally curved tooth gears which consists in cutting the side tooth surfaces of one member of the pair by rotating an annular face mill in engagement with a tapered gear blank while maintaining the axis of the tool offset from the blank axis and inclined to the blank axis at an angle greater than 90° minus the root angle of the blank, and in cutting the side tooth surfaces of the other member of the pair with a rotary annular face mill, the cutting edges of which are located on the same radius and have the same inclination to the tool axis as have corresponding cutting edges of the first tool, by offsetting and inclining the axis of the latter tool to the axis of the blank to be cut thereby to secure the desired spiral and dedendum angles on the blank and to give the cutting edges of the tool the required inclination to the tooth sides to be cut to produce the desired pressure angles of said tooth sides, and rotating said tool in engagement with the blank while rotating the blank on its axis and simultaneously producing an additional relative movement between said tool and blank about an axis angularly inclined to the blank axis.

20. The method, whereby longitudinally curved tooth gears with teeth of tapering depth may be cut with rotary annular face mills corresponding cutting edges of which are located on the same radius and have the same inclination to their respective tool axes, which consists in positioning the tool employed relative to the blank to be cut, so that its axis is offset from the blank axis and so inclined relative to the blank axis as to produce the desired spiral and dedendum angles on the blank and its cutting edges are so inclined to the tooth sides to be cut as to produce the desired pressure angles on said tooth sides.

21. The method of cutting a longitudinally curved tooth gear having teeth of tapering depth, which consists in cutting the side tooth surfaces by positioning a rotary annular face mill, so that its axis is offset from the blank axis a distance different from the mean cutter radius and is inclined to the blank axis by an angle different from 90° minus the root angle of the blank to be produced, and rotating said tool in engagement with the blank.

ERNEST WILDHABER.